United States Patent
Doh

(10) Patent No.: US 7,361,610 B2
(45) Date of Patent: Apr. 22, 2008

(54) METHOD OF ETCHING A GLASS SUBSTRATE

(75) Inventor: Yong Il Doh, Taegu-Kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 8 days.

(21) Appl. No.: 11/145,941

(22) Filed: Jun. 7, 2005

(65) Prior Publication Data
US 2005/0224462 A1 Oct. 13, 2005

Related U.S. Application Data

(63) Continuation of application No. 10/021,013, filed on Dec. 19, 2001, now abandoned.

(30) Foreign Application Priority Data
Dec. 27, 2000 (KR) ................. 2000-83103

(51) Int. Cl.
H01L 21/00 (2006.01)
H01L 21/461 (2006.01)

(52) U.S. Cl. .................. 438/745; 438/30; 216/97; 257/E21.251

(58) Field of Classification Search ............ 438/30, 438/745
See application file for complete search history.

(56) References Cited

U.S. PATENT DOCUMENTS

| 4,482,425 A | 11/1984 | Battey |
| 5,766,493 A | 6/1998 | Shin |
| 5,779,927 A * | 7/1998 | Lo ................ 216/84 |
| 5,835,176 A | 11/1998 | Jeong et al. |
| 6,001,216 A | 12/1999 | Lee |
| 6,197,209 B1 | 3/2001 | Shin et al. |
| 6,228,211 B1 * | 5/2001 | Jeong .............. 156/345.11 |
| 6,675,817 B1 | 1/2004 | Doh |

FOREIGN PATENT DOCUMENTS

| JP | 2138459 | 5/1990 |
| JP | 3022390 | 1/1991 |
| JP | 4116619 | 4/1992 |
| JP | 5249422 | 9/1993 |
| JP | 5249423 | 9/1993 |
| JP | 7168172 | 7/1995 |
| KR | 2000-19079 | 4/2000 |
| KR | 2000-24808 | 5/2000 |

* cited by examiner

Primary Examiner—Alexander Ghyka
(74) Attorney, Agent, or Firm—McKenna, Long & Aldridge LLP

(57) ABSTRACT

The present invention discloses an etching apparatus comprising an etching bath having an etchant; an etchant recycling part in the etching bath; a DI and undiluted etchant supply part for supplying a DI water and a undiluted etchant; an etchant mixing part for mixing the DI water and the undiluted etchant; and an etchant heating part for heating the mixed etchant.

7 Claims, 4 Drawing Sheets

METHOD OF ETCHING A GLASS SUBSTRATE

This application is a continuation of application Ser. No. 10/021,013, filed Dec. 19, 2001 now abandoned, which claims the benefit of Korean Patent Application No. 2000-83103 filed on Dec. 27, 2000, which is hereby incorporated by reference as if fully set forth herein.

BACKGROUND OF THE INVENTION

1. Field of the Invention

The present invention relates to an etching apparatus of a glass substrate, and more particularly, to an etching apparatus of a glass substrate using a heating unit.

2. Discussion of the Related Art

Recently, research of flat panel displays such as liquid crystal display (LCD), plasma panel display (PDP), electroluminescent display (ELD), vacuum fluorescent display (VFD), etc., is being performed and these displays are being used in various apparatus.

Among these displays, LCDs are most widely used in that they have good picture quality and low power consumption characteristics. They are being used as the display in portable televisions and notebook computers.

Portable televisions or notebook computers are obtaining the popularity due to their lightness in weight. A main component of technology development is to decrease their weight. To this end, there are specific efforts to decrease the weight of the LCD itself.

Various ways for decreasing the weight of the LCD have been tried. However, LCD structure and current technology limit the decrease of weight and size to the main elements of the LCD.

In the meanwhile, glass substrate, which is one of the most basic elements of the LCD, still has margin to decrease the weight of the LCD according to developments in processing technologies. Since the glass substrate occupies most of the total weight of the LCD, research for decreasing the weight of the glass substrate is being performed for the purpose of decreasing the weight of the LCD.

In order to decrease the weight of the glass substrate, its thickness should be decreased preferentially. However, if the thickness decreases below a specific value, the glass substrate is broken during its processing or cracks are generated. Therefore, there is a limitation in decreasing the thickness of the glass substrate.

As a way for decreasing the thickness of the glass substrate, after an LCD is fabricated using a glass substrate having the specific thickness and more, the glass substrate is etched by dipping the glass substrate in an etching bath in which an etchant is contained.

This method, however, has disadvantages in that the glass substrate is nonuniformly etched due to the incompleteness of the glass substrate itself, or foreign particles generated during the etch process are again attached to the etched surface of the glass substrate and thus the surface of the glass substrate becomes irregular.

Hereinafter, a conventional etching apparatus is described with reference to the accompanying drawings.

FIG. 1 is a block diagram of a conventional etching apparatus of glass substrates.

First, a method for fabricating an LCD using a glass substrate is described.

A pair of large-sized glass substrates each having plural pixel regions are prepared. An LCD panel is fabricated using the pair of glass substrates by attaching the glass substrates with a space between the glass substrates. The LCD panel is cut to have a selected size. Liquid crystal is injected into the space between the glass substrates.

Specifically, in the LCD panel, on one glass substrate, generally called "TFT substrate", gate lines and data lines normal to the gate lines are formed to thereby define pixel regions. A pixel electrode is formed on the defined unit pixel region. On the other glass substrate, generally called "color filter substrate", color filter of red, green, blue (R, G, B) and a common electrode are arranged. The TFT substrate and the color filter substrate are aligned with a space for the liquid crystal between them and then they are attached each other. The attached substrates are cut and then the liquid crystal is injected into the space.

In the aforementioned LCD panel fabrication process, the attached substrates are etched to decrease the weight of the substrates prior to cutting the attached substrates.

Referring to FIG. 1, the conventional etching apparatus includes: an etching bath 1 for etching a glass substrate using an etchant to a selected thickness; a cleaning bath 6 for cleaning the etched substrate using deionized (DI) water; a drying bath 7 for drying the cleaned substrate; an etchant recycling part 2 for reproducing the etchant used in the etching bath 1; a DI supply part 3 for supplying DI water or distilled water; an undiluted etchant supply part 4 for supplying a undiluted etchant; and an etchant for mixing the DI and the undiluted etchant supplied from the DI supply part 3 and the undiluted etchant supply part 4 respectively with the recycled etchant supplied from the etchant recycling part 2 and supplying the mixed etchant to the etching bath 1.

FIG. 2 shows a detailed constitution of the etching bath 1 described in FIG. 1.

Referring to FIG. 2, the etching bath 1 includes: a container 1a containing the etchant; a bubble plate 1c established at a lower portion of the container 1a, for uniformly distributing a bubble using a gas supplied from an outside source; a gas supply tube 1b for supplying nitrogen ($N_2$) or oxygen ($O_2$) to the bubble plate 1c; and a container cover 1d for covering the upper portion of the container.

Here, generating the bubbles using nitrogen or oxygen gas is to uniformly etch the surface of the glass substrate by removing a reactant remaining on the surface of the etched glass substrate when the glass substrate is etched by an exothermic reaction with the etchant used.

The etchant mixing part 5 is connected to the etching bath 1 to supply the mixed etchant to the etching bath 1. The DI supply part 3 and the undiluted etchant supply part 4 are respectively connected to the etchant mixing part 5 to supply the DI water and the undiluted etchant to the etchant mixing part 5.

The etchant mixing part 5 has to mix the DI water and the undiluted etchant with the refined etchant in a constant concentration. To do so, a concentration measuring part 5a is provided in the etchant mixing part 5. The concentration measuring part 5a measures the concentration of the etchant mixed in the etchant mixing part 5. When the concentration of a finally mixed etchant in the etchant mixing part 5 arrives at a reference concentration, the concentration measuring part 5a informs a control part (not shown) of such a fact. By the control of the control part, the supply from the DI supply part 3 and the undiluted etchant supply part 4 is stopped.

The glass substrate is etched in the etch container 1a of the etching bath 1 by an exothermic reaction between the glass substrate and the finally mixed etchant supplied from the etchant mixing part 5.

The aforementioned conventional etching apparatus, however, has a drawback as follows.

As described above, since the glass substrate is etched in the etch container 1a of the etching bath 1 by an exothermic reaction between the glass substrate and the finally mixed etchant, and the etchant mixing part 5 supplies the finally mixed etchant to the etching bath 1 at a room temperature, a long etch time is required.

SUMMARY OF THE INVENTION

It is, therefore, an object of the present invention to provide an etching apparatus of a glass substrate capable of shortening the etch time by heating an etchant for etching the glass substrate to a certain temperature and supplying the heated etchant to an etching bath.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve the above object, there is provided an etching apparatus comprising: an etching bath having an etchant; an etchant recycling part in the etching bath; a DI and undiluted etchant supply part for supplying a deionized (DI) water and an undiluted etchant; an etchant mixing for part mixing the DI water and the undiluted etchant; and an etchant heating part for heating the mixed etchant.

BRIEF DESCRIPTION OF THE DRAWINGS

It is understood that both the foregoing general description and the following detailed description are exemplary and explanatory and are intended to provide further explanation of the invention as claimed.

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a block diagram showing an etching apparatus of glass substrates in accordance with the conventional art;

FIG. 2 is a block diagram showing the etching bath of the etching apparatus of FIG. 1;

FIG. 3 is a block diagram showing an etching apparatus of glass substrates in accordance with an embodiment of the present invention; and FIG. 4 is a detailed block diagram of FIG. 3.

DETAILED DESCRIPTION OF THE PREFERRED EMBODIMENT

Figure 1:
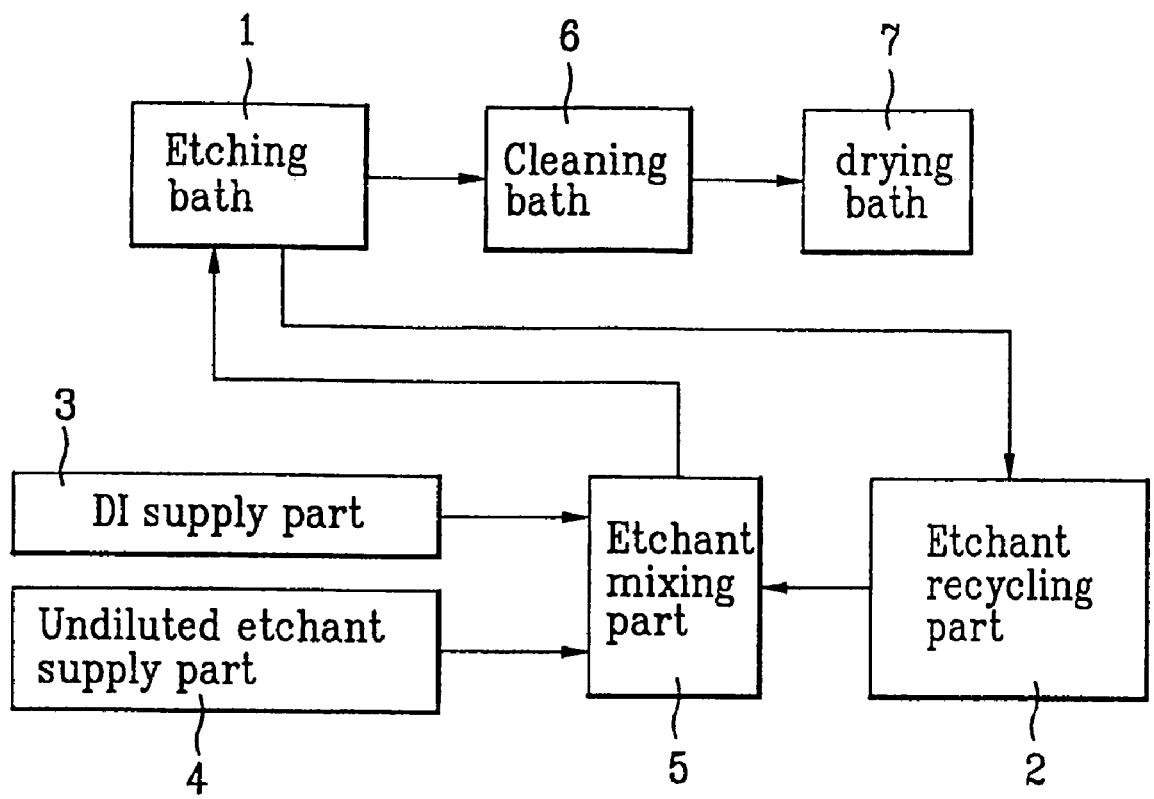
Figure 2:
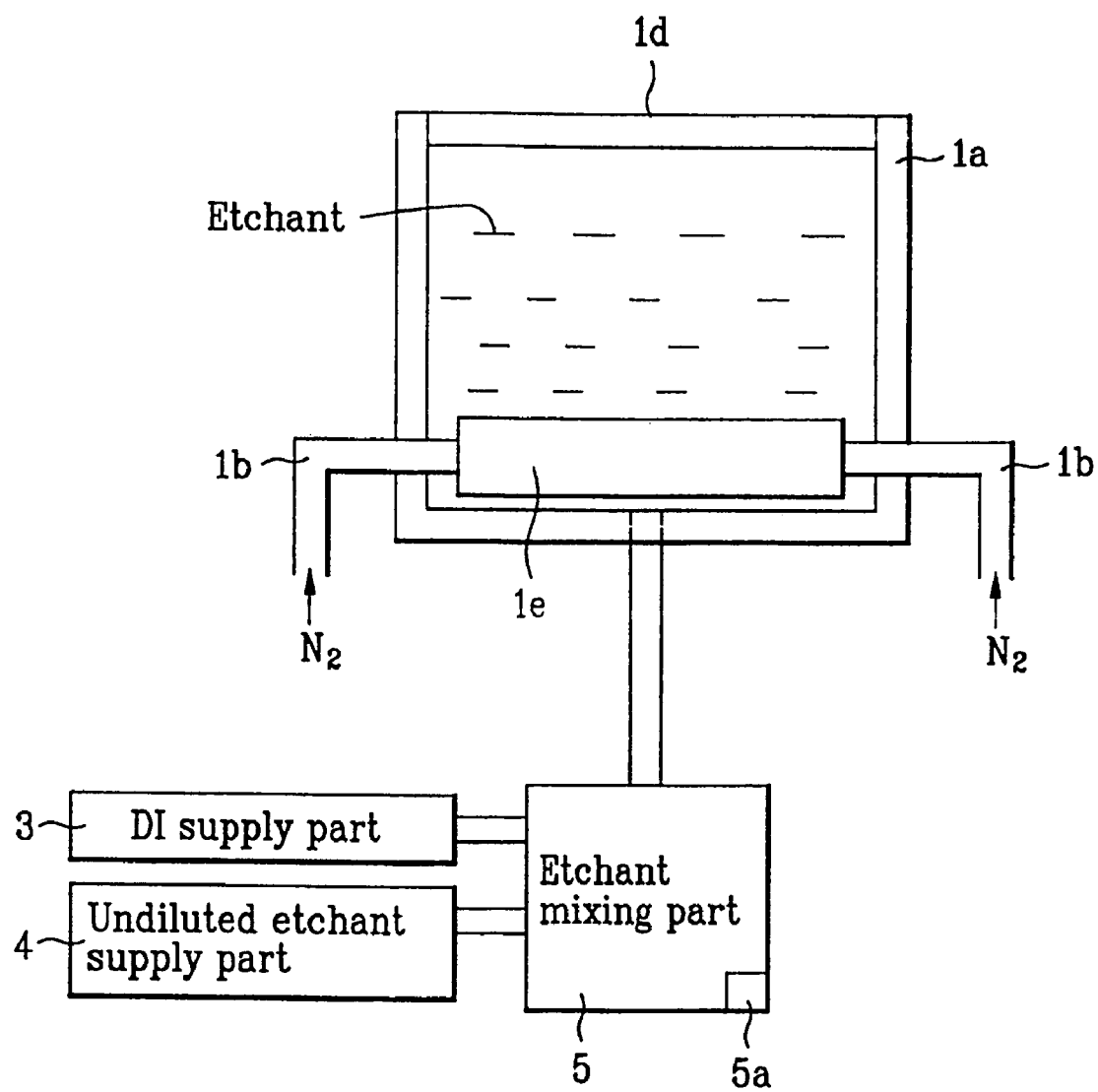

Reference will now be made in detail to the preferred embodiment of the present invention, example of which is illustrated in the accompanying drawings.

In the following description, same drawing reference numerals are used for the same elements even in different drawings. The matters defined in the description such as a detailed construction and elements of a circuit are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 3:
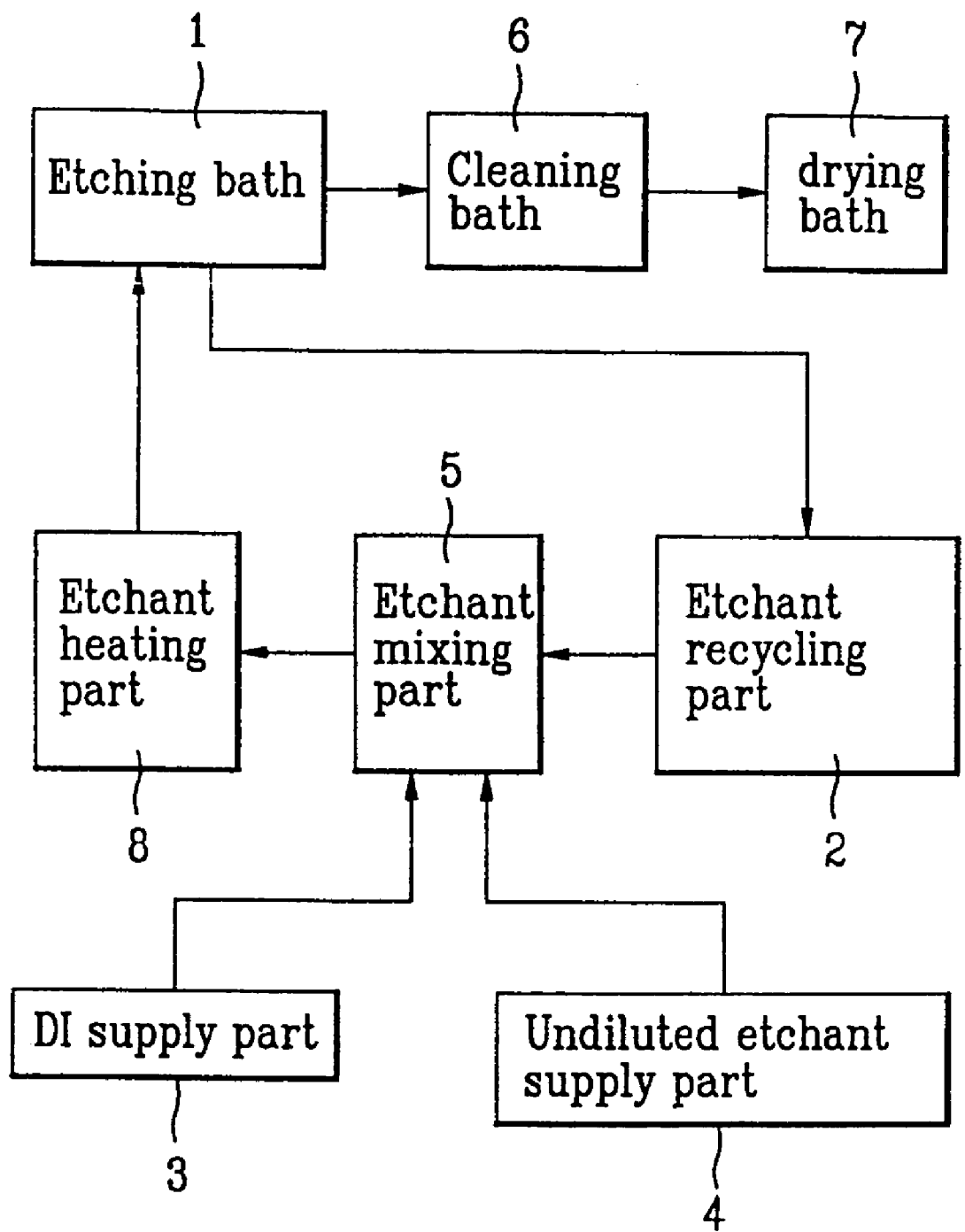

FIG. 3 is a block diagram of an etching apparatus in accordance with one preferred embodiment of the present invention.

Referring to FIG. 3, an etching apparatus includes: an etching bath having an etchant and for etching a glass substrate for an LCD; a cleaning bath 16 for cleaning the etched substrate using a deionized (DI) water, etc.; a drying bath 17 for drying the cleaned substrate; an etchant recycling part 12 for removing a foreign particle contained in the etchant used in the etching bath 11 and storing the foreign particle-removed etchant; a DI supply part 13 for supplying DI water or distilled water; an undiluted etchant supply part 14 for supplying an undiluted etchant; an etchant mixing part 15 for mixing the DI and the undiluted etchant supplied from the DI supply part 13 and the undiluted etchant supply part 14, respectively, with the recycled etchant supplied from the etchant recycling part 12 to a certain concentration; and an etchant heating part 18 for heating the mixed etchant to a certain temperature.

Here, the etchant includes an HF solution.

Figure 4:
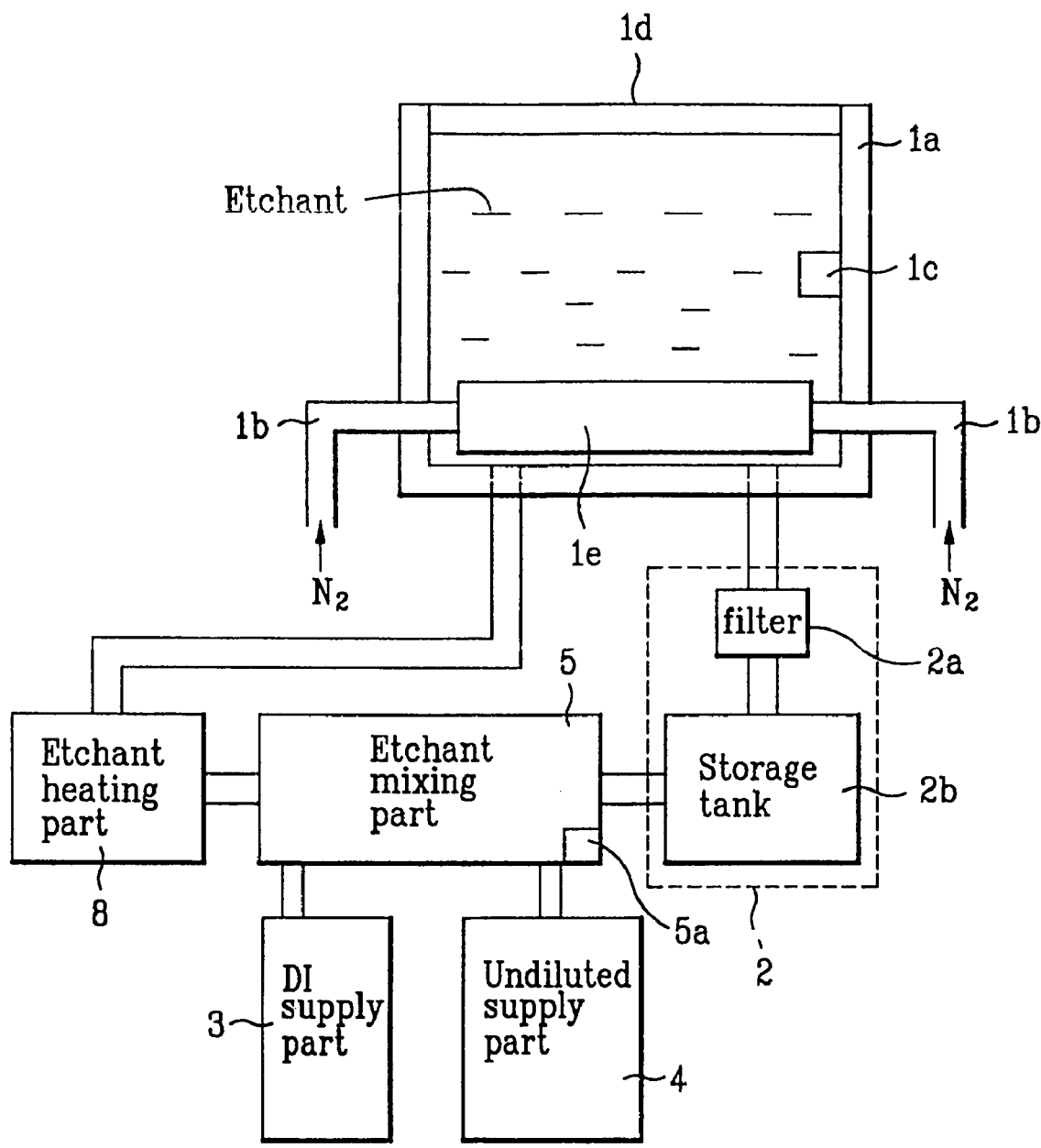

FIG. 4 is a detailed block diagram of FIG. 3.

Referring to FIG. 4, the etching bath includes; an etchant container 11a containing the etchant; a bubble plate 11c established at a lower portion of the container 11a, for generating bubbles using a gas supplied from outside; a gas supply tube 11b connected to the bubble plate 11c in a form of at least one tube, for supplying nitrogen ($N_2$) or oxygen ($O_2$) gas; a temperature measuring unit 11e established within the container 11a; and a container cover 11d for covering the container 11a.

Here, the temperature measuring unit 11e is used in controlling the etch time. In other words, the etchant as used is to remove silicon oxide ($SiO_2$) contained in the glass substrate. Thus, a reaction between the glass substrate and the HF solution is expressed as the following chemical equation Eq.1.

$$SiO_2 + HF \rightarrow SiF_4 + 2H_2O + E \qquad \text{Eq. 1}$$

where, numeral "E" is the heat generated when the glass substrate is etched.

Thus, since heat is generated upon etching the glass substrate, it is possible to know the degree of etching performed by measuring the generated heat regardless of the concentration of the etchant used and the etch time. Accordingly, a temperature of the reaction heat is computed depending on the thickness and number of a desired substrate and the etch process is stopped as the real temperature of the etchant arrives at the computed value, so that a substrate having a uniform thickness is obtained.

The etchant recycling part 12 includes a filter 12a for removing a foreign particle remaining in the etching bath 11 after etching the substrate in the etching bath 11 and a storage tank 12b for storing the etchant refined through the filter 12a.

A concentration measuring unit 15a is installed within the etchant mixing part 15 to measure the concentration of the etchant mixed in the etchant mixing part 15. Selectively, a PCW tube is installed at a selected portion within the etchant mixing part 15 to constantly maintain the temperature of the mixed etchant.

The concentration measuring unit 15a helps to constantly maintain the concentration of the etchant such as HF solution. This is because the concentration of the etchant, as well as a pressure of bubbles of the nitrogen or oxygen gas, affects the etch time. In other words, when the concentration of the etchant is low, the etch time is lengthened, while when the concentration of the etchant is high, the surface of the glass substrate is non-uniformly etched due to an abrupt exothermic and chemical reaction, and thus a spot is generated on the surface of the glass substrate.

The filter 12a is connected to a rear end of the storage tank 12b and is preferably connected to the rear end and the front end of the storage tank 12b at least one. The filter 12a removes sludge deposited within the storage tank 12b.

To transfer the etchant, tubes are connected between the etching bath 11 and the etchant heating part 18, between the etchant heating part 18 and the etchant mixing part 15 and between the etchant mixing part 15 and the etchant recycling part 12. At least one pump is installed between the tubes.

Next, an operation mechanism of the etching apparatus having the aforementioned constitution is described.

A glass substrate for an LCD is dipped in the etch container 11a of the etching bath 11, and the pump (not shown) between the etching bath 11 and the etchant heating part 18 is operated. An etchant is heated by the etchant heating part 18 and is transferred to the etch container 11a of the etching bath 11 through a tube. An exothermic reaction between the heated etchant and the glass substrate is generated in the etch container 11a and thus the glass substrate is etched. At this time, oxygen or nitrogen gas is injected into the bubble plate 11c of the etching bath 11 from the gas supply tube 11b, and thus bubbles are generated in the etchant contained in the etch container 11a. The generated bubbles remove foreign particles adhered to the surface of the glass substrate.

After that, the used etchant is transferred from the etch container 11a into the etchant recycling part 12 through a tube connected between them. The etchant is refined by passing through the filter 12a and then is stored in the storage tank 12b. Afterwards, the refined etchant is again transferred to the etchant mixing part 15. Then, the etchant mixing part 15 mixes the refined etchant with DI water or distilled water supplied from the DI supply part 13 and the undiluted etchant supplied from the undiluted etchant supply part 14.

At this time, when the concentration of the mixed etchant in the etchant mixing part 15 arrives at a reference concentration, the etchant mixing part 15 stops the supply from the DI supply part 13 and the undiluted etchant supply part 14 using the concentration measuring unit 15a installed therein.

The etchant mixed in a constant concentration within the etchant mixing part 15 is introduced into the etchant heating part 18 through a tube connected between them and then is heated at the etchant heating part 18 in a temperature higher than the room temperature. The heated etchant is again introduced into the etch container 11a of the etching bath 11 by the pump pressure.

Then, an exothermic reaction occurs between the supplied etchant and the glass substrate, and thereby the glass substrate dipped is etched. The temperature measuring unit 11e of the etching bath continuously measures a temperature variation of the etchant contained in the etch container 11a generated by the exothermic reaction. As a result of the measurement, when the measured temperature does not arrive at the reference temperature, the aforementioned steps are repeatedly performed, while when the measured temperature arrives at a reference temperature, the etch process is automatically stopped.

As described previously, the etching apparatus of the present invention has the following advantages.

First, the etchant is heated and thus a fast exothermic reaction between the etchant and a workpiece such as glass substrate occurs, so that the etching rate is enhanced.

Second, the enhanced etching rate allows the amount of the undiluted etchant which is used for constantly maintaining the concentration of the etchant to be decreased, so that production costs are substantially lowered.

In other words, since the exothermic reaction between the etchant and the glass substrate at a temperature higher than the room temperature shortens the reaction time greatly over that at the room temperature, the etching apparatus of the present invention shortens the reaction time, thereby improving the performance of the apparatus.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of etching a glass substrate for a display device, comprising:
   mixing deionized water and a undiluted etchant to form a glass etchant;
   heating the glass etchant to a temperature greater than room temperature before providing the glass etchant in an etching bath;
   providing the heated glass etchant in an etching bath;
   providing a display panel having a glass substrate in the etching bath provided with the heated glass etchant for etching the glass substrate;
   measuring a temperature of the etching bath;
   stopping the etching of the glass substrate on a basis of the measured temperature;
   refining the glass etchant provided the etching bath;
   storing the refined glass etchant in a storage tank;
   further refining the refined glass etchant provided from the storage tank; and
   mixing the refined glass etchant with the deionized water and the undiluted etchant and forming the glass etchant.

2. The method according to claim 1, wherein the display device is a liquid crystal display device.

3. The method according to claim 2, further comprising: generating bubbles using a gas during the etching of the glass substrate.

4. The method according to claim 3, wherein the gas includes nitrogen ($N_2$) or oxygen ($O_2$).

5. The method according to claim 2, wherein the glass etchant includes HF.

6. The method according to claim 2, wherein the glass etchant is heated after the glass etchant is provided in the etching bath.

7. The method according to claim 2, wherein the etching is an exothermic reaction.

* * * * *